Patented May 8, 1928.

1,668,801

UNITED STATES PATENT OFFICE.

JOHN H. CALBECK, OF JOPLIN, AND JOHN A. SCHAEFFER, OF ST. LOUIS, MISSOURI, ASSIGNORS TO THE EAGLE-PICHER LEAD COMPANY, OF CINCINNATI, OHIO, A CORPORATION OF OHIO.

STORAGE-BATTERY PLATE.

No Drawing. Application filed July 26, 1924. Serial No. 728,368.

Our invention relates to the manufacture of storage battery plates and has for its object to provide a plate of relatively high capacity and generally good characteristics.

Our invention is based on our discovery that the fumed basic lead sulphate invented by John A. Schaeffer, John H. Calbeck and Bernard S. White and forming the subject matter of their Patent No. 1,524,315, dated Jan. 27, 1925, when used alone or with litharge or red lead, or both, in the dry form and applied to storage battery grids, solution being subsequently added, or when used either alone or in admixture with litharge or red lead, or both, made into a paste with suitable vehicles and applied to storage battery grids and treated in suitable ways in process, has notable advantages over mixtures or pastes heretofore used. Among others, that the paste has relatively better characteristics in process and that the finished plate is of relatively high capacity and of suitable durability.

The fumed basic lead sulphate which in use is characterized by freedom from metallic compounds other than those of lead, and by freedom from uncombined lead oxide. It is made by spraying a pure lead in a state of fine division into a heated furnace having an atmosphere containing oxygen and sulphur dioxide gas and regulating the sulphur dioxide so as to produce a fumed basic lead sulphate with the desired lead sulphate component.

We use this fumed basic lead sulphate alone or with litharge or red lead, or both, in the dry form and applied to storage battery grids, solution being subsequently added, or use this fumed basic lead sulphate alone or mixed with litharge or red lead, or both, made into a paste with suitable vehicles and applied to storage battery grids to obtain a battery material which is more suitable as compared with battery materials now generally used and applied to storage battery grids in general practice, and subject the plates to a development treatment of a suitable character.

The process by which the fumed basic lead sulphate is made is such as to make possible the presence in the product of high percentages of combined lead oxide and for certain purposs we find it advantageous to use in the pasting of the plate grids such fumed basic lead sulphate high in combined lead oxide and free from uncombined lead oxide.

Having now described our invention, what we claim as new and desire to secure by Letters Patent, is:

1. A storage battery plate of high capacity, long life and high porosity in which the formed paste comprises substantial amounts of fumed basic lead sulphate and of the derivatives of such fumed basic lead sulphate formed in the development of the plate.

2. A storage battery plate of high capacity, long life and high porosity in which the formed paste comprises substantial amounts of substantially pure fumed basic lead sulphate and of the derivatives of such fumed basic lead sulphate formed in the development of the plate.

JOHN H. CALBECK.
JOHN A. SCHAEFFER.